US012283052B2

(12) United States Patent
Bhowmick et al.

(10) Patent No.: US 12,283,052 B2
(45) Date of Patent: Apr. 22, 2025

(54) METHOD AND SYSTEM FOR AUTOMATICALLY DETECTING ANATOMICAL STRUCTURES IN A MEDICAL IMAGE

(71) Applicant: KONINKLIJKE PHILIPS N.V., Eindhoven (NL)

(72) Inventors: Soumabha Bhowmick, Bangalore (IN); Subhendu Seth, Bangalore (IN); Karthik Krishnan, Bangalore (IN); Celine Firtion, Surat (IN); Pallavi Vajinepalli, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 313 days.

(21) Appl. No.: 17/792,013

(22) PCT Filed: Jan. 12, 2021

(86) PCT No.: PCT/EP2021/050416
§ 371 (c)(1),
(2) Date: Jul. 11, 2022

(87) PCT Pub. No.: WO2021/144230
PCT Pub. Date: Jul. 22, 2021

(65) Prior Publication Data
US 2023/0038364 A1 Feb. 9, 2023

(30) Foreign Application Priority Data
Jan. 16, 2020 (EP) .................................... 20152186

(51) Int. Cl.
*G06T 7/10* (2017.01)
*G06T 7/00* (2017.01)
(Continued)

(52) U.S. Cl.
CPC .............. *G06T 7/10* (2017.01); *G06T 7/0012* (2013.01); *G06T 7/11* (2017.01); *G06T 7/70* (2017.01);
(Continued)

(58) Field of Classification Search
CPC . G06T 7/0012; G06T 7/10; G06T 7/11; G06T 7/70; G06T 2207/10132;
(Continued)

(56) References Cited

U.S. PATENT DOCUMENTS 10,748,021 B2 * 8/2020 Kim .......................... G06N 3/08
11,681,919 B2 * 6/2023 Pham ................... G06F 18/2113
382/173

(Continued)

FOREIGN PATENT DOCUMENTS

| EP | 2911111 A2 | 8/2015 |
| WO | 2017124221 A1 | 7/2017 |
| WO | 2020254159 A1 | 12/2020 |

OTHER PUBLICATIONS

JPO Decision of Refusal in Japanese Patent Application No. 2022-543166 (Year: 2024).*

(Continued)

*Primary Examiner* — Scott A Rogers

(57) ABSTRACT

The invention relates to a computer-implemented method for automatically detecting anatomical structures (3) in a medical image (1) of a subject, the method comprising applying an object detector function (4) to the medical image, wherein the object detector function performs the steps of: (A) applying a first neural network (40) to the medical image, wherein the first neural network is trained to detect a first plurality of classes of larger-sized anatomical structures (3a), thereby generating as output the coordinates of at least one first bounding box (51) and the confidence (Continued)

Figure 1:
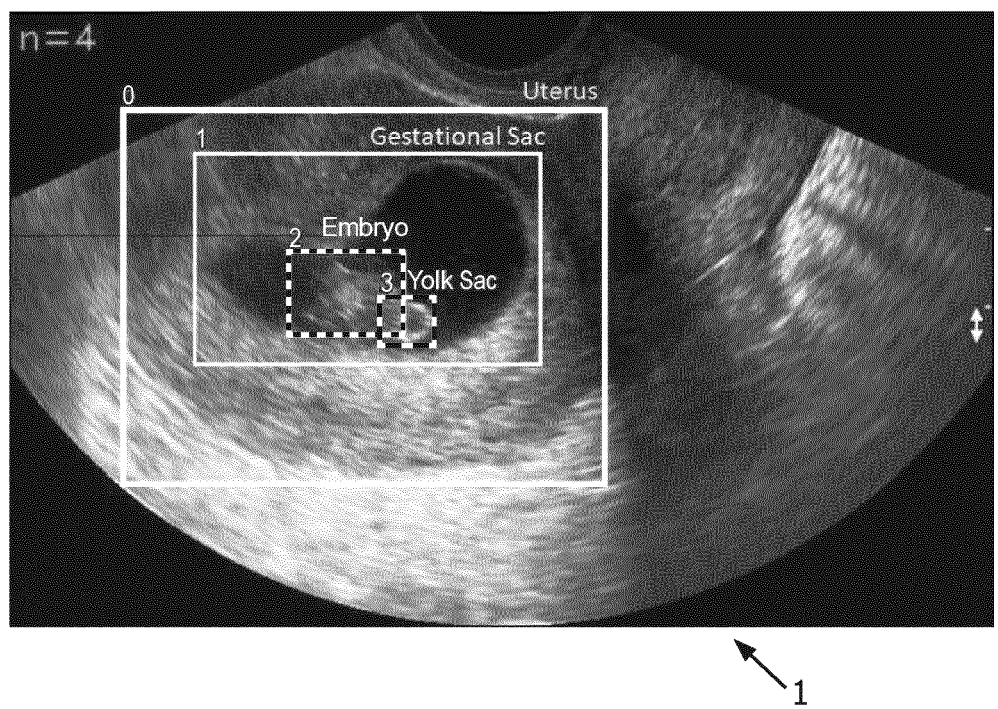

score of it containing a larger-sized anatomical structure; (B) cropping (42) the medical image to the first bounding box, thereby generating a cropped image (11) containing the image content within the first bounding box (51); and (C) applying a second neural network (44) to the cropped medical image, wherein the second neural network is trained to detect at least one second class of smaller-sized anatomical structures (3b), thereby generating as output the coordinates of at least one second bounding box (54) and the confidence score of it containing a smaller-sized anatomical structure.

15 Claims, 8 Drawing Sheets

(51) Int. Cl.
| | |
|---|---|
| *G06T 7/11* | (2017.01) |
| *G06T 7/70* | (2017.01) |
| *G06V 10/25* | (2022.01) |
| *G06V 10/26* | (2022.01) |
| *G06V 10/764* | (2022.01) |
| *G06V 10/774* | (2022.01) |
| *G06V 10/82* | (2022.01) |

(52) U.S. Cl.
CPC ............ *G06V 10/25* (2022.01); *G06V 10/267* (2022.01); *G06V 10/764* (2022.01); *G06V 10/774* (2022.01); *G06V 10/82* (2022.01); *G06T 2207/10132* (2013.01); *G06T 2207/20081* (2013.01); *G06T 2207/20084* (2013.01); *G06T 2207/20132* (2013.01); *G06T 2207/30044* (2013.01); *G06V 2201/03* (2022.01)

(58) Field of Classification Search
CPC . G06T 2207/20081; G06T 2207/20084; G06T 2207/20132; G06T 2207/30044; G06V 10/25; G06V 10/267; G06V 10/764; G06V 10/774; G06V 10/82; G06V 2201/03
See application file for complete search history.

(56) References Cited

U.S. PATENT DOCUMENTS

| | | | | |
|---|---|---|---|---|
| 11,756,291 | B2* | 9/2023 | Turkelson | G06V 30/19173 |
| 2015/0230773 | A1 | 8/2015 | Cho et al. | |
| 2019/0114804 | A1* | 4/2019 | Sundaresan | G06T 7/74 |
| 2019/0130580 | A1* | 5/2019 | Chen | G06V 10/82 |
| 2019/0304102 | A1* | 10/2019 | Chen | G06N 20/00 |
| 2023/0213646 | A1* | 7/2023 | John Wilson | G06V 10/25 |
| | | | | 342/179 |

OTHER PUBLICATIONS

JPO Notice of Reasons for Refusal in Japanese Patent Application No. 2022-543166 (Year: 2024).*
JPO Written Opinion in Japanese Patent Application No. 2022-543166 (Year: 2024).*
International Search Report and Written Opinion for PCT/EP2021/050416; Mailing date: Apr. 13, 2021, 10 pages.
Cervantes, E. et al., "Hierarchical part detection with deep neural networks," 2016 IEEE International Conference on Image Processing (ICIP), 2016, pp. 1933-1937.
Redmon, J. et al., "YOLOv3: An Incremental Improvement", arXiv:1804.02767, 2018, 6 pages.
Deng, Y. et al., "A hierarchical model for automatic nuchal translucency detection from ultrasound images", Computers in Biology and Medicine, 2012, vol. 42, Issue 6, pp. 706-713.
Pato, L.V., et al., "Seeing without Looking: Contextual Rescoring of Object Detections for AP Maximization", arXiv:1912.12290, 2020, 14 pages.
Yang, X. et al., "Towards Automated Semantic Segmentation in Prenatal Volumetric Ultrasound", IEEE Trans Med Imaging, Jan. 2019; vol. 38, No. 1, pp. 180-193.
De Vos, BD et al., "ConvNet-Based Localization of Anatomical Structures in 3-D Medical Images", arXiv:1704.05629, 2017, 12 Pages.
Bueno, M. et al., "Hierarchical Object Detection with Deep Reinforcement Learning", arXiv:1611.03718, 2016, 9 pages.
Lin, Z. et al., "Multi-task learning for quality assessment of fetal head ultrasound images", Medical Image Analysis, 2019, vol. 58, 14 pages.
Baumgartner, C.F. et al., "SonoNet: Real-Time Detection and Localisation of Fetal Standard Scan Planes in Freehand Ultrasound", IEEE Transactions on Medical Imaging, 2017, vol. 36, pp. 2204-2215.
Gidaris, S. et al., "Object detection via a multi-region & semantic segmentation-aware CNN model", IEEE International Conference on Computer Vision, 2015, pp. 1134-1142.
Redmon, J. et al., You Only Look Once: Unified, Real-Time Object Detection, arXiv:1506.02640, 2016, 10 pages.
"ISUOG Practice, Guidelines: performance of first-trimester fetal ultrasound scan", Ultrasound Obstet Gynecol, 2013, vol. 41, pp. 102-113.
Hasan R. et al., "Association Between First-Trimester Vaginal Bleeding and Miscarriage", Obstet Gynecol., 2009, vol. 114, No. 4, pp. 860-867.
Prager, S. et al., "ACOG Practice bulletin No. 200: Early pregnancy loss", Obstetrics & Gynecology, 2018, vol. 132, pp. e197-e207.
"ACOG Practice bulletin No. 101: Ultrasonography in Pregnancy", Obstetrics & Gynecology, 2009, 11 pages.
Bodla, N. et al., "Improving Object DetectionWith One Line of Code", arXiv:1704.04503v2, 2017, 9 pages.

* cited by examiner

METHOD AND SYSTEM FOR AUTOMATICALLY DETECTING ANATOMICAL STRUCTURES IN A MEDICAL IMAGE

CROSS-REFERENCE TO PRIOR APPLICATIONS

This application is the U.S. National Phase application under 35 U.S.C. § 371 of International Application No. PCT/EP2021/050416, filed on Jan. 12, 2021, which claims the benefit of European Patent Application No. 20152186.1, filed on Jan. 16, 2020. These applications are hereby incorporated by reference herein.

FIELD OF THE INVENTION

The invention relates to a computer-implemented method for automatically detecting anatomical structures in a medical image of a subject, a method for training an object detector function useful in detecting a plurality of classes of anatomical structures in medical images, and a related computer program and system.

BACKGROUND OF THE INVENTION

Medical imaging such as X-Ray, computed tomography (CT), magnetic resonance imaging (MRI), positron emission tomography (PET) and ultrasound imaging modalities have become widely available and are regularly used for diagnostic and other medical purposes. However, for example due to various artefacts, noise and other sources of image inaccuracies, the interpretation of medical images remains challenging. In particular the interpretation of ultrasound images is known to have a high intra-user and inter-user variability rate, even amongst specialists such as radiologists, certified sonologists, etc. This situation is exacerbated by the fact that ultrasound is often performed in the context of medical emergency by junior or emergency room doctors. There is therefore a need for computer-implemented assistance in detecting and identifying anatomical structures and/or determining the probability of pre-defined medical conditions from medical images.

One example where such computer-implemented assistance is desirable is antenatal ultrasound screening, which is recommended for every pregnant woman worldwide. The primary aims of the first trimester's ultrasound scan are assessing the viability of the pregnancy and dating it, counting the number of fetuses and ruling out abnormal first trimester pregnancies, such as ectopic pregnancies and miscarriages. Pregnancy loss is common at this early stage, and ectopic pregnancy is a crucial abnormal clinical finding that often goes undetected and is still globally an important source of maternal death. Ultrasound imaging plays a pivotal role in identifying the above-mentioned clinical findings early in first trimester pregnancies. However, inter-observer and intra-observer variability rates, even among specialists, greatly limits the diagnostic value of ultrasound images.

Deep learning techniques have made significant progress in the past years regarding pattern recognition, detecting objects, classifying images as well as semantic segmentation. First attempts have been made to apply artificial neural networks for localizing anatomical structures in medical images.

The paper by Bob D. de Vos, Jelmer M. Wolterink, Pim A. de Jong, Tim Leiner, Max A. Viergever and Ivana Isgum "ConvNet-Based Localization of Anatomical structures in 3D Medical Images", IEEE Transactions on Medical Imaging, PP. DUI.: 10.1109/TMI. 2017. 2673121, 19 Apr. 2017, proposes a method for automatic localization of one or more anatomical structures in 3D medical images though detection of their presence in 2D image slices using a convolutional neural network (ConvNet). A single ConvNet is trained to detect presence of the anatomical structure of interest in axial, coronal and sagittal slices extracted from a 3D image. To allow the ConvNet to analyse the slices of different sizes, spatial pyramid pooling is applied. After detection, 3D bounding boxes are created by combining the output of the ConvNet in all slices. The output feature maps of the spatial pyramid pooling layer are connected to a sequence of two fully-connected layers, which are connected to an output layer of 2N end-nodes, with N indicating the number of target anatomical structures. Spatial pyramid pooling allows analysis of images of variable input sizes.

WO 2017/1242221 A1 discloses a method for object detection, comprising grouping object classes to be detected into a plurality of object clusters constituting a hierarchical tree structure; obtaining an image and at least one bounding box for the obtained image; evaluating objects in each bounding box by convolutional neural networks respectively trained for each of the clusters of the hierarchical tree structure, from a root cluster to leaf clusters of the hierarchical tree structure, to determine a deepest leaf cluster of the objects; and outputting an object class label at the determined deepest leaf cluster as a predicted object class label of the object.

The paper by Y. Deng, Y. Wang, P. Chen and J. Yu: "A hierarchical model for automatic nuchal translucency detection from ultrasound images", Computers in Biology and Medicine 42 (2012) 706-713 proposes an algorithm for automated detection of the nuchal translucency (NT) region. When given an ultrasound image, the whole body of the fetus is first recognized and located. Then the NT region and the head of the fetus can be inferred from the image based on the knowledge of the body. The established graphical model appropriately denotes such causal relationship among objects of the NT region, head and body.

The paper by CERVANTES ESTEVE ET AL.: "Hierarchical part detection with deep neural networks" 2016 IEEE INTERNATIONAL CONFERENCE ON IMAGE PROCESSING (ICIP), IEEE, 25 Sep. 2016 (2016-09-25), pages 1933-1937, XP033016808, discloses an end to end hierarchical object and part detection framework. Accordingly, using a single convolutional neural network a bounding box is determined in inputted image data in order to detect the object. Further, within the bounding box a single proposal is determined for each part of the object.

EP 2911111 A2 discloses an apparatus and a method for lesion detection. The method of lesion detection involves detecting lesion candidates from a medical image, detecting anatomical objects from the medical image, verifying each of the lesion candidate based on anatomical context information comprising information regarding a location relationship between the lesion candidates and the anatomical objects, and removing one or more false positive lesion candidate from the detected lesion candidates based on a verification result.

OBJECT OF THE INVENTION

It is an object of the invention to provide a robust, computer-assisted method for detecting and identifying anatomical structures in medical images, which preferably works on commodity hardware at near real-time speed. It is a further object of the invention to provide a computer-assisted solution for identifying certain anatomical structures with a precision equivalent to or surpassing human performance. As an example, it would be desirable to have a robust, computer-assisted solution for the identification of intra-uterine pregnancy (IUP) features, as well as its abnormal counterparts, in particular pregnancy loss and ectopic pregnancy, to improve the OBGYN workflow (diagnosis of IUP and its gestational age).

SUMMARY OF THE INVENTION

These objects are met or exceeded by a computer-implemented method for automatically detecting anatomical structures in a medical image of a subject according to claim 1, a method for training an object detector function useful in detecting a plurality of classes of anatomical structures according to claim 11, a computer program according to claim 14 and a system according to claim 15. Advantageous embodiments are set out in the dependent claims. Any features, advantages or alternative embodiments described herein in relation to the claimed method are also applicable to the other claim categories and aspects of the invention, in particular the training method, the claimed system and computer program, and vice versa. In particular, the object detector function and the neural networks can be provided or improved by the claimed method. Furthermore, the input/output data to the object detector function can comprise advantageous features and embodiments of the input/output training data, and vice versa.

According to a first aspect, the invention provides a computer-implemented method for automatically detecting anatomical structures in a medical image of a subject, the method comprising the steps of:
  a) receiving at least one medical image of a field-of-view of the subject;
  b) applying an object detector function to the medical image, wherein the object detector function is trained to detect a plurality of classes of anatomical structures, thereby generating as output the coordinates of a plurality of bounding boxes and a confidence score for each bounding box, the confidence score giving the probability of the bounding box containing an anatomical structure belonging to one of the plurality of classes;
characterized in that the object detector function performs the steps of:
  applying a first neural network to the medical image, wherein the first neural network is trained to detect a first plurality of classes of larger-sized anatomical structures, thereby generating as output the coordinates of at least one first bounding box and the confidence score of it containing a larger-sized anatomical structure;
  cropping the medical image to the first bounding box, thereby generating a cropped image containing the image content within the first bounding box;
  applying a second neural network to the cropped medical image, wherein the second neural network is trained to detect at least one second class of smaller-sized anatomical structures, thereby generating as output the coordinates of at least one second bounding box and the confidence score of it containing a smaller-sized anatomical structure.

Accordingly, the invention provides a hierarchical anatomical identification scheme for the automated detection in medical images of anatomical structures of different sizes or scales of details. Given that certain anatomical structures of smaller size or lower scale of detail (smaller-sized anatomical structures) are expected to be found within another anatomical structure of larger size or higher scale of detail (larger-sized anatomical structures), the invention advantageously crops the input medical image to a bounding box containing the larger-sized anatomical structure, and uses the cropped image for searching the smaller-sized anatomical structure. In this manner, the neural network that is used at each hierarchical level to detect an anatomical structure (e.g. at the larger-sized and smaller-sized hierarchical level) requires a much simpler architecture, can be trained faster and is more robust, i.e. has a higher average precision. In other words, an independent and separate neural network may be implemented at each hierarchical level and may be thus specifically trained for the specific detection task in accordance with the hierarchical level. As an example, in early pregnancy ultrasound (US) images, the yolk sac is expected to be found in the gestational sac. However, it has been found that the yolk sac (YS), being a very subtle structure, cannot be trained well along with comparatively bigger anatomical structures. In order to achieve better detection, a dedicated second neural network may be trained on the cropped images, wherein e.g. the gestational sac (GS) is cropped from the original input medical image. This is reducing the search area, thereby improving training and subsequently the detection.

In an embodiment, the computer-implemented method of the invention may be implemented on any commodity hardware, such as a regular PC, laptop, tablet computer, cloud computer, server, and in particular, on an ultrasound system used for performing ultrasound scans. The method may also be performed on a remote computer, i.e. images may be acquired by an ultrasound scan, uploaded onto a remote computer or server, for example via the internet or a cellular connection, and processed there according to the invention. The results of the invention, e.g. the coordinates of at least one first and one second bounding box and the confidence score of these bounding boxes containing a certain anatomical structure, as well as typically the class of said anatomical structure, may be transferred back via internet or cellular connection to the ultrasound scanner or any other hardware device, where it can be used in appraisal of the images.

The invention makes use of trained artificial neural networks (NN), namely a first neural network and a second neural network used one after the other. That is, the first neural network and the second neural network may have different inputs and/or different outputs. In this manner, a hierarchical anatomical identification scheme for pre-determined anatomical structures has been implemented and has shown excellent results in reliably detecting the pre-defined anatomical structures. Thereby, a diagnosis approach can be made more systematic. In case of first trimester pregnancies, the invention may ultimately improve the clinical outcome of abnormal early first trimester pregnancy, in particular due to an increased detection rate of ectopic pregnancies. However, the invention is not limited to the cases of early pregnancy, but may be applied to many different medical conditions and clinical applications.

The medical image which is inputted to the object detector function is preferably a 2D image. This is because the first and second neural networks which are preferably employed are best suited for 2D image processing. However, an extension to 3D is possible. The inputted medical image may be generated by any medical imaging modality, such as X-ray, CT, MRI, PET, or ultrasound, such as B-mode ultrasound, Color-Doppler, Shear Wave Elastography, etc.

In an embodiment, the method is applied to a series of medical images, which may be a time-series of medical images, such as a sequence of medical images acquired from a moving target structure, such as the heart. It may also be a series of medical images covering various fields-of-view, such as may be obtained during an ultrasound scan by sweeping the probe through a region of interest. In order to process many medical images, in an embodiment the method renders its results in real-time or near-real time, for example at a frame rate of 10-60, preferably 20-40 FPS (frames/images per second).

The field-of-view of the input medical image may cover any region of interest in the human or animal body, for example the head or brain, limbs, parts of limbs or any organ or group of organs, for example within the chest, torso or abdomen, such as the heart, lung, breast, liver, kidney, reproductive organs, intestine, etc. An "anatomical structure" may be any anatomical feature identifiable within such field-of-view, e.g. one of the before-mentioned organs or a part thereof, such as uterus, gestational sac, embryo, fluid in Douglas cul-de-sac, ovary, yolk sac, a specific bone, blood vessel, heart valve, or an abnormal structure such as a tumor, cyst, a lesion, an aneurism, or an implanted structure such as a screw, knee or shoulder implant, implanted heart valve etc. In an embodiment, the object detector function is trained to detect a plurality of different pre-defined anatomical structures, wherein each kind of anatomical structure corresponds to a "class" (e.g. "uterus" may be one class, "ovary" may be another class). In an embodiment, each pre-defined kind/class of anatomical structure may be delimited against other organs on medical images, so that a radiologist could draw a bounding box completely containing said anatomical structure. In an embodiment, the bounding boxes generated by the object detector function are rectangular and preferably axis-aligned, i.e. the four sides of the rectangle are aligned with the four edges of the medical image, and/or with the sides of the other bounding boxes.

In an embodiment, each input medical image is a square 2D image, i.e. it has the same number of pixels in width and height direction. For the purposes of this invention, it is advantageous, if the object detector function is trained to a specified image size, for example 416×416 pixels. Accordingly, the inventive method may comprise a further optional step, in which the medical image(s) received from the imaging modality are re-scaled to the specified input size for the object detector function, e.g. by known interpolation techniques.

The object detector function comprises a first neural network, which is trained to detect larger-sized anatomical structures, and a second neural network trained to detect smaller-sized anatomical structures. By larger-sized and smaller-sized, it is meant that the smaller-sized anatomical structures are typically (i.e. in most subjects) smaller or have more and finer details, than the smallest or the average of the larger-sized anatomical structures. In an embodiment, at least one of the smaller-sized anatomical structures is typically contained within or is part of one of the larger-sized anatomical structures. As to absolute sizes, the smaller-sized anatomical structure(s) might be typically less than 40 mm, preferably less than 30 mm, most preferred less 20 mm in mean diameter, optionally with a minimum size of between 0.2 and 5 mm. The larger-sized anatomical structures may be typically more than 10 mm, preferably more than 20 mm and more preferred more than 30 mm in mean diameter, optionally with a maximum size of between 50 and 400 mm.

Examples for matching sets of larger-sized and smaller-sized anatomical structures can be found in the table below:

| Larger-sized anatomical structure | Smaller-sized anatomical structure |
|---|---|
| Human heart, left ventricle, right ventricle, left atrium, right atrium | Aortic valve, pulmonary valve, mitral valve, tricuspid valve, septum, artificial valve, coronary blood vessel |
| Liver | Blood vessel, tumor |
| Uterus, gestational sac, embryo | Yolk sac, embryo |
| Fetus | NT, fetal heart |

The object detector function is based on a hierarchical relationship between larger-sized and smaller-sized anatomical structures, wherein at least one of the first plurality of classes of larger-sized anatomical structures is—at least in some medical conditions—expected to contain one or several of the classes of smaller-sized anatomical structures. In first trimester screening, for example, the classes of larger-sized anatomical structures may comprise uterus (U), gestational sac (GS) and optionally embryo (E). The classes of smaller-sized anatomical structures may comprise yolk sac (YS) and optionally embryo (E). Thereby, the inventive method allows the automated detection of IUP (Intra-uterine pregnancy) based on the relationship of the bounding boxes that localize uterus, GS, yolk sac and embryo, using an automated deep-learning based approach by generating bounding boxes. The first level of automation (i.e. the first neural network) will localize the presence of GS within uterus or otherwise, since both uterus and GS are among the first plurality of classes of larger-sized anatomical structures. In a next step, the medical image is cropped to the first bounding box, which in an example is a bounding box containing the gestational sac, thereby generating a cropped image containing the image content within the first bounding box, i.e. a smaller image containing mostly only the GS. A second level of automation (using the second neural network) is the identification of the presence/absence of embryo boxes and yolk sac boxes within the cropped image, i.e. within the gestational sac. This hierarchical relationship of the bounding boxes provides automatic identification of IUP and non-IUP cases, like ectopic pregnancy.

The output of the inventive method is the bounding boxes and the confidence score of each bounding box containing a certain class of anatomical structure. The output may be visualized by outputting the medical image and/or the cropped image, and displaying the bounding boxes having the highest confidence score thereon, e.g. in a contrasting colour scheme, or overlaid on the image.

An advantage of the invention is that it allows a robust, computer-assisted identification of anatomical structures, both larger-sized anatomical structures and at least one, usually several, classes of smaller-sized anatomical structures which may (or may not) be contained within one of the larger-sized anatomical structures. By using this two-step approach, the detection and identification of the smaller-sized anatomical structures is rendered significantly more precise and robust. In the case of the field-of-view covering the uterus of a woman in early pregnancy, the invention may serve to make the diagnosis of normal or abnormal early pregnancy more systematic, in particular the diagnosis of ectopic pregnancies, molar pregnancies or adnexal features.

In an embodiment, the method comprises a further step of
c) determining the probability of a pre-defined medical condition of the subject, using an inferencing scheme based on the presence or absence of one or several classes of anatomical structures and/or on the relative spatial locations of the detected bounding boxes containing anatomical structures.

A pre-determined medical condition may be any clinical finding which can be inferred from the presence or absence, and the relative spatial locations of the detected bounding boxes containing anatomical structures. It is usually not a diagnosis as such, but merely the probability of a certain medical condition, which may for example be the probability of the presence or absence of tumours or other localized abnormalities (which might be the smaller-sized anatomical structures) in pre-defined organs (which might be the larger-sized anatomical structures);
an intra-uterine pregnancy;
an ectopic pregnancy;
pregnancy loss (e.g. when no embryo or yolk sac is found within the gestational sac).

The rendered probability may be 1 or 0, but may also take a value in-between, and may depend on the confidence score of the bounding boxes used for its determination. The inferencing scheme may for example comprise a number of IF ELSE commands, which are implemented in an algorithm in any computational language. In the case of first trimester pregnancy, the inferencing scheme may for example be as follows: Let the bounding box of uterus be denoted as $B_u$ and of GS as $B_{GS}$. If $B_{GS}$ is a subset of $B_u$, then it is inferred as normal IUP, else it is termed as abnormal pregnancy. In the second level automation of using the second neural network, yolk sac (YS) and embryo are detected and localised. Let the bounding boxes for yolk sac and embryo be termed $B_{YS}$ and $B_E$. If $B_{YS}$ and/or $B_E$ are subsets of $B_{GS}$, then it is termed as a normal pregnancy. If YS and embryo are not detected within GS, then the chances of abnormal pregnancy are increased. An "increased" probability of a medical condition may for example mean that its probability is above a pre-defined threshold, for example above a value in the range of 50-95%, preferably 60-90%.

Accordingly, in some embodiments, the probability of a pre-defined medical condition, for example IUP, is increased if a first detective bounding box containing a first class of anatomical structure (e.g. the GS) encompasses or contains a second detected bounding box containing a second class of anatomical structure, e.g. GS. The first anatomical structure may completely encompass, i.e. completely contain, the second bounding box, or possibly the algorithm may allow for a pre-defined amount of overlap. For example, a pre-defined percentage (e.g. at least 80%) of the second bounding box has to be inside the first bounding box to increase the probability.

In other embodiments, the relative spatial locations of the detecting bounding boxes may not only require that one bounding box is a subset of the other, but there may also be conditions on the bounding boxes of two or more classes of anatomical structures having a pre-determined range of ratios in size, and/or a pre-determined amount of overlap, and/or a predetermined spatial relationship.

According to an embodiment, the method is iterated for a plurality of two-dimensional medical images with different fields-of-view, which are acquired during the same examination session of the subject, and the confidence scores of the detected bounding boxes are used to compute the medical image(s) or field(s)-of-view, which are most suitable for further evaluation. Further evaluation may in this case be either that the respective medical images having bounding boxes with the highest confidence score are subjected to further observation by a skilled user, or to further automatic image analysis techniques, such as segmentation, modelling, feature detection, measurements of distances, feature tracking, etc. Further evaluation may also mean that the identified field-of-view is used for acquiring further images from this field-of-view, possibly by other imaging techniques, for example using Doppler-ultrasound, when the medical images used so far have been B-mode US images.

In another embodiment, also the orientation of further 2D planes used for acquiring further medical images is determined from the detected bounding boxes. Accordingly, the detected bounding boxes along with the corresponding input images may be used for the computation of the best planes, meaning e.g. those with maximum confidence scores. For example, a weighted average of the bounding boxes and the confidence scores have been used in formulating a confidence interval which has been subsequently used for best plane computations. For example, those medical images capturing the largest cross-section of a certain anatomical structure are used for further evaluation. These planes/images along with the corresponding bounding boxes may then be used for automated computation of key parameters like, in the example of first trimester pregnancy screening, e.g. yolk-sac diameter, mean sac diameter of gestational sac, crown rump length of embryo, ectopic/ectopic mass, amount of fluid in Douglas cul-de-sac. Accordingly, the invention may also be used to automatically identify either standard planes/fields-of-view or good planes/fields-of-view, in which further measurements may be performed on the anatomical structures.

The object detector function according to the invention may be provided in the form of the software program, but may also be implemented as hardware. In an embodiment, each detection step of the object detector function is done by a single neural network. In the first step, the single first NN is applied to the full medical image, and in the second step, a single second NN is applied to the cropped image. The respective NN may divide the input image into regions and predict bounding boxes and probabilities for each region. These bounding boxes may be weighted by the predicted probabilities. In an embodiment, only bounding boxes with a certain confidence score of 20-40%, e.g. 25% or higher will be displayed and/or taken into account.

In an embodiment, the first and second artificial neural networks (NN) forming part of the object detector function have a similar or identical architecture, but are trained to detect different classes of anatomical structures, and possibly a different number of classes. The second NN is more specialized to detect particular smaller-sized anatomical structures which would be harder to detect in the full medical image which is input to the first NN. The first and second NNs may also be of a different type. Thus, in the following whenever the term "neural network" is used, the first and/or the second NN are meant, preferably both, but not necessarily.

An artificial neural network (NN) is based on a collection of connected artificial neurons, also called nodes, wherein each connection, also called edge, can transmit a signal from one node to another. Each artificial neuron receiving a signal may process it and transfer it to further artificial neurons connected to it. In useful embodiments, the artificial neurons of the first and second NN are arranged in layers. The input signals, i.e. the pixel values of the medical image, travel from the first layer, also termed the input layer, to the last layer, the output layer. In an embodiment, the first and/or second NN are feed-forward networks. The first and second NN preferably each comprises several layers, including hidden layers, and are thus deep neural networks. In an embodiment, the first and second NNs are trained on the basis of machine learning techniques, in particular deep-learning, for example back propagation. Further, the first and second NNs may be provided in the form of a software function which is not necessarily structured exactly the same way as the neural network which was trained. For example, if certain connections or edges have the weight 0 after training, such connections may be omitted when providing the object detector function.

According to an embodiment, the first neural network and/or the second neural network do not comprise fully-connected layers, i.e. layers in which each node may be connected to each node in the subsequent layer. In an embodiment, the first and/or second NN comprise at least one convolutional layer. In an embodiment, the first and/or second neural network, preferably both, are fully convolutional neural networks (CNNs). A fully convolutional NN may be defined as one that has no fully-connected layers. A convolutional layer applies a relatively small filter kernel over the entire layer, so that the neurons inside the layer are connected to only a small region of the proceeding layer. This architecture ensures that the learned filter kernels produce the strongest response to a spatially local input pattern. In an embodiment of the invention, the convolutional layer's parameters comprise a set of learnable filter kernels, which have a small perceptive field, but which extend though the full depth of the layer volume. During a forward pass through the convolutional layer, each filter kernel is convolved across the width and height of the input layer, computing the dot product between the entries of the filter kernel and the input layer, and producing an output map relating to his filter kernel. Stacking the output maps for all filter kernels along the depth dimension forms the full output volume of a convolutional layer, also referred to herein as feature map.

A convolutional layer is generally defined by the size (dimension) and the stride of its filter kernels, wherein a single convolutional layer may comprise several filter kernels, each producing a different output map, which are stacked together for all feature kernels along the depth dimension, thereby forming an output volume or feature map. The filter kernel is usually extended through the full depth of the input volume. Thus, if the input layer to a convolutional layer has dimension of 416×416×3, and the filter kernel has size 3×3, it essentially means that the convolutional filter kernel has a dimension of 3×3×3. This will result in a single feature map. The stride of a filter kernel is the number of pixels by which the filter kernel shifts as it convolves around the input layer/volume. Thus, a filter kernel of stride 2 will result in a dimensional reduction of the output layer compared to the input layer by a factor of 2.

In an embodiment, the first and/or second NNs comprise between 3 and 14, preferably 4 to 10, blocks of layers, each block comprising a convolutional layer employing a number of filters each having a filter kernel of size 3×3 and stride 1, followed by a maxpool layer of size 2×2 and stride 2. Each such block thus reduces the dimension of the layer by a half. In an embodiment, the convolutional layers of the first and/or second NN down-sample the input medical image by a factor of $2^3$-$2^7$, preferably $2^4$-$2^6$, for example by $2^5$=32. In this example, by using an input image of size 416×416, the output feature map may have dimension 13×13.

By using combinations of convolutional layers and maxpool layers, the dimensions of the image are reduced as it travels through the first and/or second NN, thereby finally resulting in a 3D tensor encoding the coordinates of several bounding boxes, the confidence score of each bounding box, and class predictions, e.g. the probability of the detected object belonging to one of the pre-defines classes of anatomical structures.

In an embodiment, the first and/or second neural network are adaptations of the YOLOv3 network, in particular a YOLOv3 tiny network. The YOLOv3 is disclosed in J. Redmon, A. Farhadi: "YOLOv3: An Incremental Improvement", arXiv preprint arXiv: 1804.02767, 2018, published in https://arxiv.org/abs1804.02767. Trained on a tiny version of YOLOv3, the detection runs comfortably, without requiring any extra hardware support.

Output of the first/second NN: In an embodiment, for each possible bounding box, the first and/or second NN predicts a confidence score ("objectness") giving the probability of the bounding box containing an anatomical structure belonging to any one of the plurality of classes, and the class probabilities, i.e. the probability that the object (anatomical structure) in the bounding box belongs to each of the trained classes. If there are ten different classes of objects/anatomical structures, in which the network has been trained, the network will predict ten probability values for each bounding box. Only such bounding boxes, where confidence score and class probability exceed a certain pre-defined threshold will be considered.

In an embodiment, the eventual output of the first and/or second NN of the invention is generated by applying a 1×1 detection kernel on the (final) down-sampled feature map, also referred to as output grid, in an embodiment of the invention on feature maps of two different sizes at two different places in the network. The shape of the detection kernel is 1×1×(B*(5+C)). Here B is the number of bounding boxes which a grid cell on the feature map can predict, "5" is for the four bounding box attributes (off-set in x, y-direction and width/height off-set from the anchor box, as explained below), and one object confidence score, also referred to as "objectness", and C is the number of classes. Accordingly, if the final feature map has a dimension of N×N (for example 9×9, 13×13 or 26×26), the 3D output tensor has a size of N×N×[B*(4+1+C)] for B anchor boxes, 4 bounding box attributes, 1 objectness prediction and C class predictions. If B=3, each grid cell in the last layer may predict up to three bounding boxes, corresponding to three anchor boxes. For each anchor box, the tensor comprises the confidence score, i.e. the probability the box contains an object, four numbers to represent the bounding box coordinates in relation to the anchor box, and a probability vector containing the probabilities of the object belonging to one of each pre-defined class. From among the different class probabilities, each class score is predicted using logistic regression, and a threshold is used to predict one or several annotations for each detected anatomical structure. Class probabilities higher than this threshold are assigned to the bounding box.

Anchor boxes/Bounding box Priors: In an embodiment, like in YOLOv3, the NNs predict the positions of the bounding boxes in terms of xy offsets relative to a particular cell in the output grid, for example the 13×13 grid. Once the image is divided into the final grid, for each object (anatomical structure), the grid cell containing the object's centre is identified, and this grid cell is now "responsible" for predicting the object. Thus, the centre of each bounding box is described in terms of its off-set from the responsible cell. Further, instead of predicting the width and height of a bounding box directly, the NNs of this embodiment (like YOLOv3) predict width and height off-sets relative to a prior box, also referred to as anchor box herein. Accordingly, during training, the networks are trained to predict off-sets from a pre-determined set of anchor boxes with particular height-width ratios, which have been determined from the training data using clustering. The coordinates of the annotation boxes of the training data are clustered into the number of anchor boxes as required, for example in yolov3 tiny there are required 6 anchor boxes. Usually a k means clustering algorithm has been used to generate a set of anchor boxes. The ratio of the intersection over union between ground truth and the anchor box is usually taken as the distance metric for the k-means clustering algorithm. In an embodiment of the inventive first and/or second NNs, each grid cell in the output tensor predicts three bounding boxes in terms of their offsets in height and width from three anchor boxes. In other words, in case the output grid has a size of 13×13, a maximum of 13×13×3 bounding boxes can be detected.

Detection across scales: According to an embodiment of the invention, the first and/or second NN comprises the detection of anatomical structures at two to three, preferably two, different scales, each scale given by a pre-determined down-sampling of the medical image. This concept is termed "prediction across scales" by the YOLOv3 authors. Thereby, an earlier layer in the NN is merged with a later layer (which is first up-sampled) using concatenation. This is done because smaller objects are more easily detected in the higher resolution early layers, than in the significantly sub-sampled low-resolution later layers, but the later layers contain semantically strong features. By merging a higher-resolution earlier layer with an up-sampled later feature map, the method allows to get more meaningful semantic information from the up-sampled feature map and finer-grained information from the earlier feature map. Thereby, a second output tensor may be predicted, which has twice the size than the prediction at scale 1. In the YOLOv3, this is done at three scales, whereas the inventive network preferably makes predictions only at two different scales, one at the most down-sampled layer, and one layer having a dimension of $2^1$-$2^2$ times the final layer. Typically, the inventive neural network will predict (N×N+2N×2N)×3 bounding boxes, for two different scales. The bounding boxes are filtered out using thresholds on the confidence scores as well as class probabilities, and according to an embodiment another filter called non-maximum suppression, which is a function of the ratio of intersection over union (IOU) between two bounding boxes, is applied. The key steps of the maximum suppression filter are as follows:

Select a bounding box (satisfying the thresholds on class probability and confidence score);

Compute overlap with all other boxes satisfying the thresholds and remove boxes that overlap it more than a pre-determined IOU threshold;

Go back to step a) and iterate until there are no more boxes with a lower confidence score than the current selected box.

Further information on non-maximum suppression can be found on https://arxiv.org/pdf/1704.04503.pdf.

This ensures that the best bounding box, in particular the best bounding box between the two scales, remains as the output.

The great advantage of using this network architecture is that both training and robustness of the network is greatly improved, in particular if the network is trained only on a limited number of classes, as can be realized for clinical applications.

The size of the input medical image is preferably an uneven number times $2^Z$, where Z may be an integer between 4 and 10, so that after several (e.g. Z) down-sampling steps, the final grid will have an uneven dimension, such as 7×7, 9×9, 11×11 or 13×13. Thereby, there will be one central grid cell, which is advantageous because larger-sized objects/anatomical structures are often found in the centre of an image, so that it is advantageous that one single grid cell is responsible for detecting the largest-sized objects.

According to a preferred embodiment, the object detector function is trained to detect 2 to 12, preferably 3 to 6 classes of anatomical structures. For example, the first neural network may be trained to detect 2-10, preferably 3-6 classes. In the case of first semester screening, for example, the classes are GS, uterus and embryo. The second neural network may be trained to detect even fewer classes, for example 1-4, for example only one class, e.g. yolk sac. By this reduction of classes, the first and second NN can be made very small, only 9-16, preferably 13 convolutional layers each, and hence, very fast and robust.

According to an embodiment, the method step a) comprises the step of receiving a video stream of medical images acquired during an ultrasound scan of the subject. Hence, the inventive method may be applied to a time series of medical images at a frame rate of 20-100 frames per second. Further, if the ultrasound images are encoded in a video stream, they will not be grey scale images, but colour-images having three channels. Typically, all three channels have the same values, since the ultrasound image is a grey image. Thus, the input to the object detector function may be a medical image in the three-channel format, such as RGB. This has the advantage that the same NN architecture as used for photographic images may be adapted for the processing of the medical image.

According to a useful application, the medical images are acquired during an antenatal first trimester ultrasound scan, and the plurality of classes of anatomical structures comprises uterus, gestational sac (GS), embryo and/or yolk sac (YS). Most preferred, the first NN is trained to detect a first plurality of classes, the larger-sized anatomical structures comprising uterus, gestational sac and embryo. The second NN may thus be trained to detect yolk sac and possibly further smaller-sized anatomical structures.

Referring to the inferencing scheme, in an embodiment concerning the application "first trimester screening", the probability of the medical condition "normal pregnancy" is increased, if the detected bounding box of a uterus comprises a detected bounding box of a gestational sac, and the detected bounding box of a gestational sac, comprises a detected bounding box of an embryo and/or a yolk sac. This hierarchical inferencing scheme of the bounding boxes provides automatic identification of normal IUP and non-IUP cases, like ectopic. Thereby, the diagnostic approach can be made more systematic, and a simple scheme may be used to detect abnormal pregnancy.

According to another aspect, the invention provides a method for training an object detector function useful in detecting a plurality of classes of anatomical structures in medical images, the object detector function comprising a first neural network, the method comprising:

(a) Receiving input training data, namely at least one medical image of a field-of-view of a subject;

(b) Receiving output training data, namely a tensor comprising coordinates of at least one first bounding box within the medical image containing a larger-sized anatomical structure belonging to one of a first plurality of classes of larger sized anatomical structures, and a number indicating the class of the larger-sized anatomical structure;
(c) training the first neural network function by using the input training data and the output training data.

The training method may be used to train the object detector function described herein, wherein the first neural network being trained preferably is built as described herein. Also, the input training data are medical images of a field-of-view as described herein, for example B-mode ultrasound images of the human body, in particular of the reproductive organs in first trimester pregnancy. To generate the output training data, the medical images constituting the input training data may be manually annotated with axis-aligned bounding boxes, each bounding box covering one anatomical structure entirely. The data generated therefrom is a tensor comprising the coordinates of at least one first bounding box containing a larger-sized anatomical structure, and a number indicating the class of said anatomical structure, wherein for example the different classes used are uterus, GS and embryo. In an embodiment, the object detector function may be trained with a dataset derived from 5-15 subjects, with approximately 100-1000 images per subject. Bounding boxes are drawn for all possible anatomies present in these images. The training step may be done similarly to the Darknet framework developed in https://pjreddie.com/darknet/yolo/. However, the configurational parameters are preferably adjusted in order to achieve better performance in terms of training speed and training loss. In particular, the learning rate and batch sizes are preferably adjusted. In an embodiment, of the training method, the following parameters have been used:
Number of batches during training=64
Number of Subdivisions during training=16
Max Number of batches=500200
Number of filters in the final layer=(No of classes+5)×3
Anchor points=Depends on the resolution of the image, the dimension of the bounding box.
Number of steps=24000,27000

In the training phase of the first and/or second NN, usually a batch of images are read and passed as input training data. Each batch is divided into mini-batches. Let the batch size be N and the number of mini batches be n. Then at a time (N/n) images will be fed to the network. The parameter depends on the GPU availability. By using a smaller subdivision, the mini-batch size for computing gradient increases. Hence, the computed gradient based on a larger mini-batch size gives a better optimization. One batch can also be considered as an epoch according to the deep learning conventions.

According to an embodiment, the training method also comprises steps to train the second NN, comprising the further steps of:
(d) Receiving input training data, namely a cropped image containing the image content of a first bounding box containing a larger-sized anatomical structure;
(e) Receiving output training data, namely a tensor comprising coordinates of at least one second bounding box within the cropped image containing a smaller-sized anatomical structure belonging to at least one second class of smaller sized anatomical structures;
(f) training the first neural network function by using the input training data and the output training data.

Thus, the same input training data can be used as for training the first NN, but in this case a cropped image containing the image content of a bounding box containing a larger-sized anatomical structure is used as input training data. The output training data are the bounding box coordinates of a smaller-sized anatomical structure.

The training method described herein may be used to provide the object detector function used for detecting anatomical structures, i.e. to initially train the first and/or second NN. It may also be used to recalibrate an already trained network. The training of the first and second NNs may be done by back-propagation. In this method, the input training data is propagated through the respective NN using pre-determined filter kernels. The output is compared to the output training data using an error or caused function, the output of which is propagated back through the NN, thereby calculating gradients to find the filter kernels, or possibly other parameters such as bias, that yield minimum errors. This may be done by adjusting the weights of the filter kernels and following negative gradients in the cost-function.

The invention is also related to a computer program comprising instructions which, when the program is executed by a computational unit, causes the computational unit to carry out the inventive method. This is true for the method of automatically detecting anatomical structures in a medical image, and for the training methods, in particular the training methods of the first and the second NNs. The computer program may be implemented using Darknet. It is a framework developed to train neural networks, it is open source and written in C/CUDA and serves as the basis for YOLO. The repository and the wiki are in this particular link (https://pjreddie.com/darknet/). The computer program may be delivered as a computer program product.

The computational unit which may execute the inventive method may be any processing unit such as a CPU (Central Processing Unit) or GPU (Graphics Processing Unit). The computational unit may be part of a computer, a cloud, a server, a mobile device such as a laptop, tablet computer, mobile phone, etc. In particular, the computational unit may be part of an ultrasound imaging system. Said ultrasound imaging system may also comprise a display device such as a computer screen.

The invention is also directed to a computer-readable medium comprising instructions which, when executed by a computational unit, causes the computational unit to carry out the method according to the invention, in particular the method for automatically detecting anatomical structures in a medical image or the training method. Such computer-readable medium may be any digital storage medium, for example a hard disk, a server, a cloud, or a computer, and optical or magnetic digital storage medium, a CD-ROM, a SSD-card, a SD-card, a DVD or an USB or other memory stick. The computer program may be stored on the computer-readable medium.

In an embodiment, the method also comprises a step of displaying the medical image together with the at least one first bounding box and the at least one second bounding box displayed in a contrasting color, so that a user may check the accuracy of the prediction.

According to another aspect, the invention is also related to a system for automatically detecting anatomical structures in a medical image of a subject, the system comprising:
a) a first interface, configured for receiving at least one medical image of a field-of-view of the subject;
b) a computational unit configured for applying an object detector function to the medical image, wherein the object detector function is trained to detect a plurality of classes of anatomical structures, thereby generating as output the coordinates of a plurality of bounding boxes and a confidence score for each bounding box, the confidence score giving the probability of the bounding box containing an anatomical structure belonging to one of the plurality of classes, wherein the computational unit is configured for performing the steps of:

applying a first neural network to the medical image, wherein the first neural network is trained to detect a first plurality of classes of larger-sized anatomical structures, thereby generating as output the coordinates of at least one first bounding box and the confidence score of it containing a larger-sized anatomical structure;

cropping the medical image to the first bounding box, thereby generating a cropped image containing the image content within the first bounding box;

applying a second neural network to the cropped medical image, wherein the second neural network is trained to detect at least one second class of smaller-sized anatomical structures, thereby generating as output the coordinates of at least one second bounding box and the confidence score of it containing a smaller-sized anatomical structure.

The system is preferably configured to execute the inventive method for automatically detecting anatomical structures in a medical image. The computational unit may be any processing unit, as described above in relation to the computational unit executing the program. The system may be implemented on an ultrasound imaging system, in particular on one of its processing units such as a GPU. However, medical images may also be transferred from the imaging system to another computational unit, local or remote, for example via internet, and the coordinates of the bounding boxes, or even the probability of a pre-defined medical condition, are transferred back from there to the imaging system and displayed or otherwise outputted to a user. In an embodiment, the system may include a second interface for outputting the bounding box coordinates, in particular for outputting the medical image with the first and second bounding boxes drawn in. The second interface may thus be connected to a display device, such as a computer screen, touch screen, etc.

Further, the invention is also directed to a system for training an object detector function, and in particular a first and/or second NN by the training method described herein.

According to a further aspect, the invention is directed to an ultrasound imaging system comprising an ultrasound transducer configured to transmit and receive ultrasound signals, a computational unit configured for applying an object detector function to the medical image, as described herein, the ultrasound imaging system may comprise the system according to the invention. Due to the low computational cost of the inventive method, it may be executed on existing ultrasound imaging systems.

SHORT DESCRIPTION OF THE FIGURES

Figure 2:
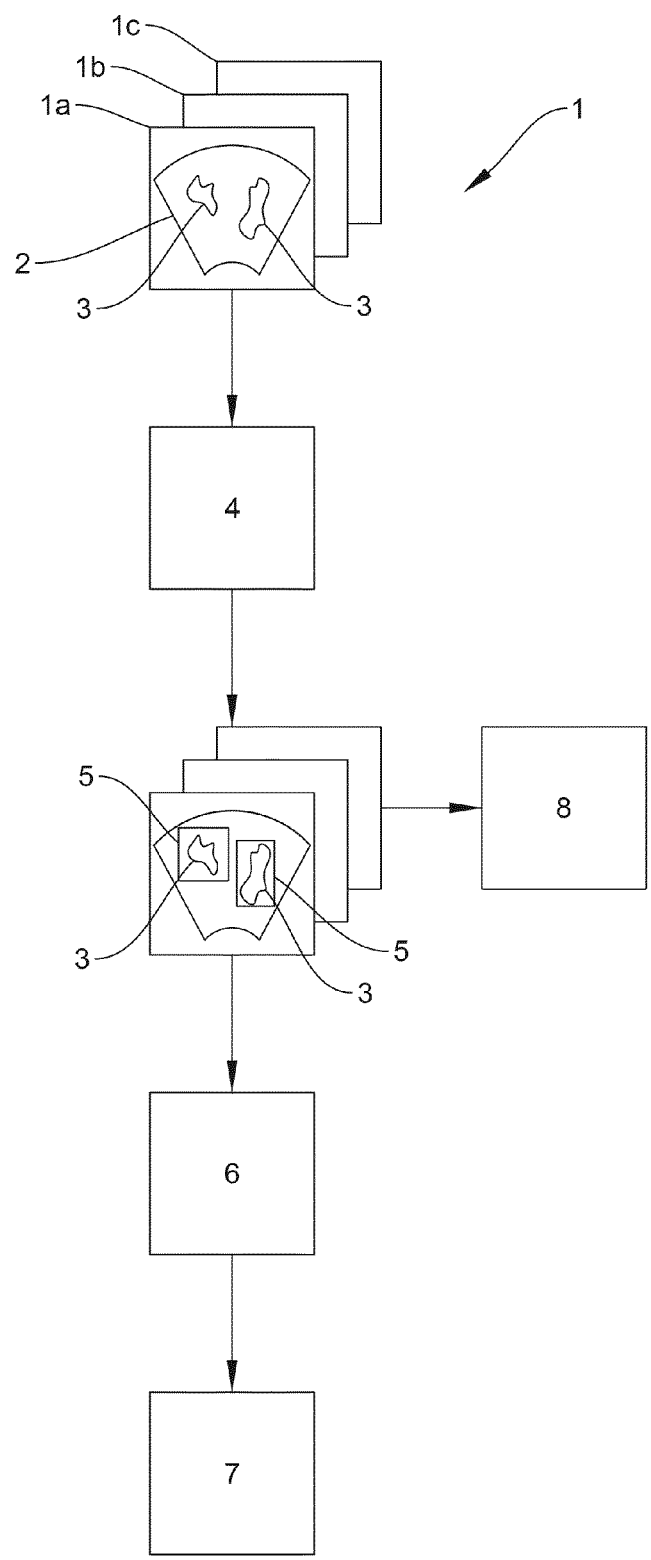
Figure 3:
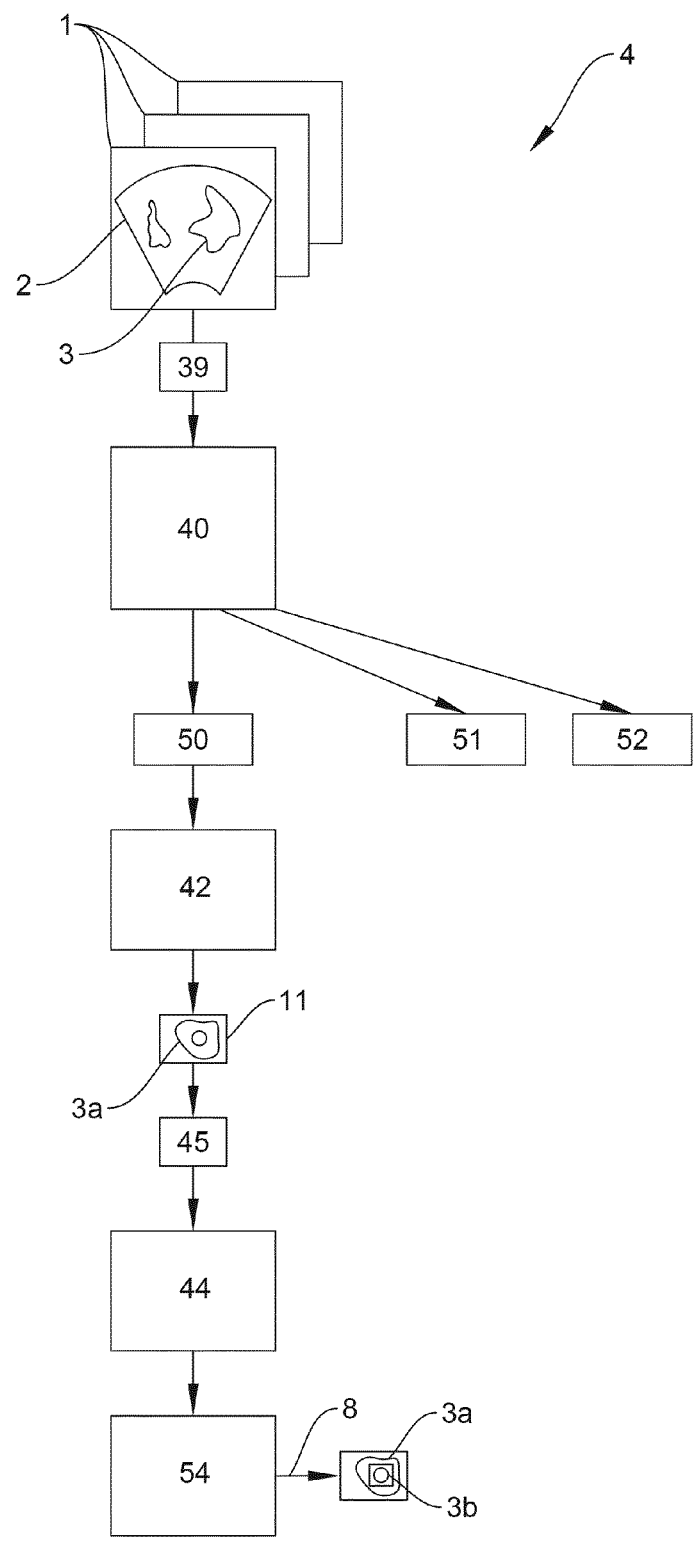
Figure 4:
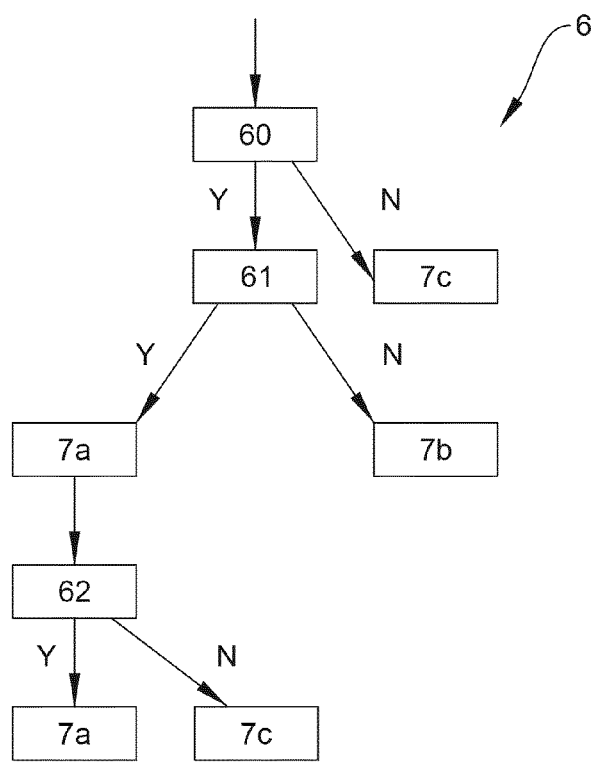
Figure 5A:
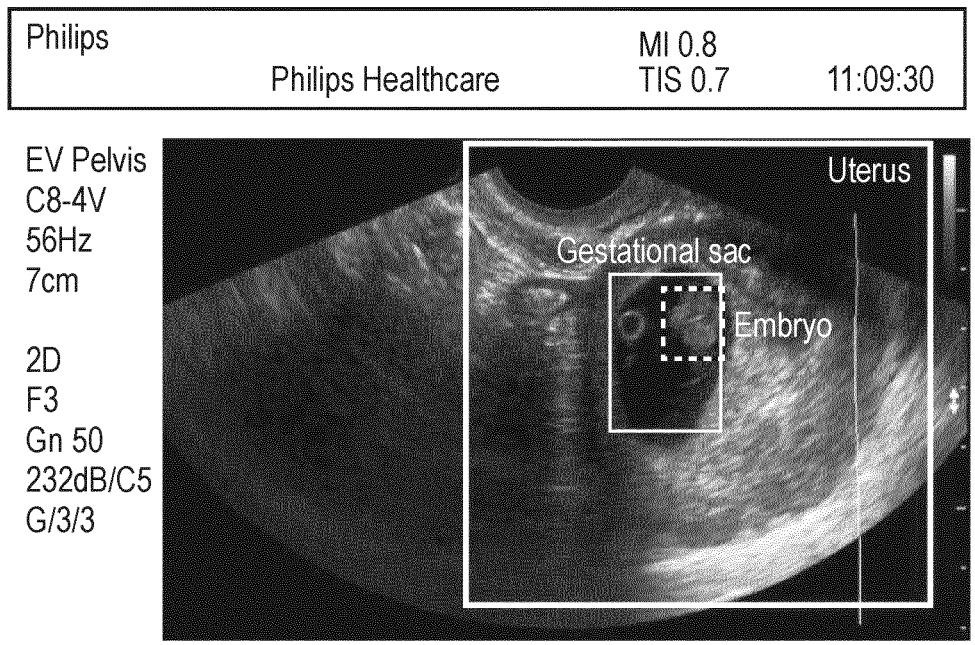
Figure 5A:
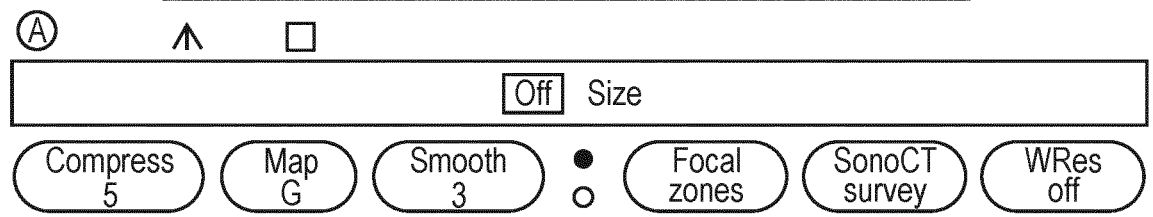
Figure 6:
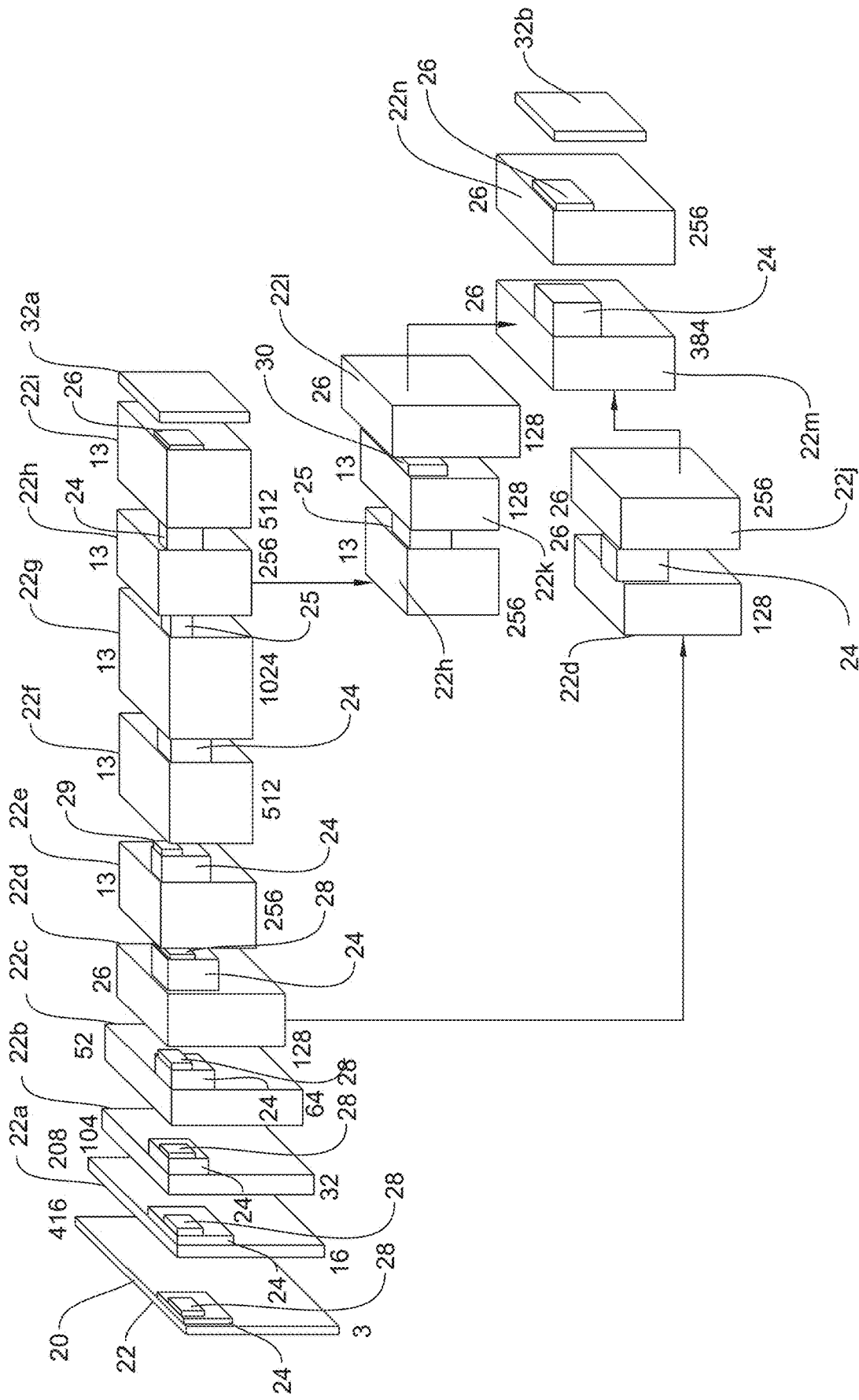
Figure 7:
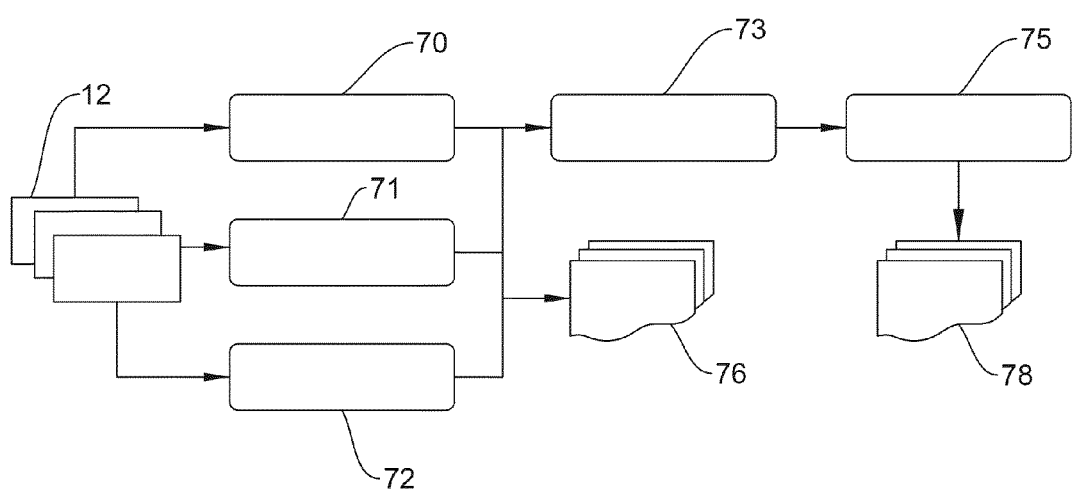
Figure 8:
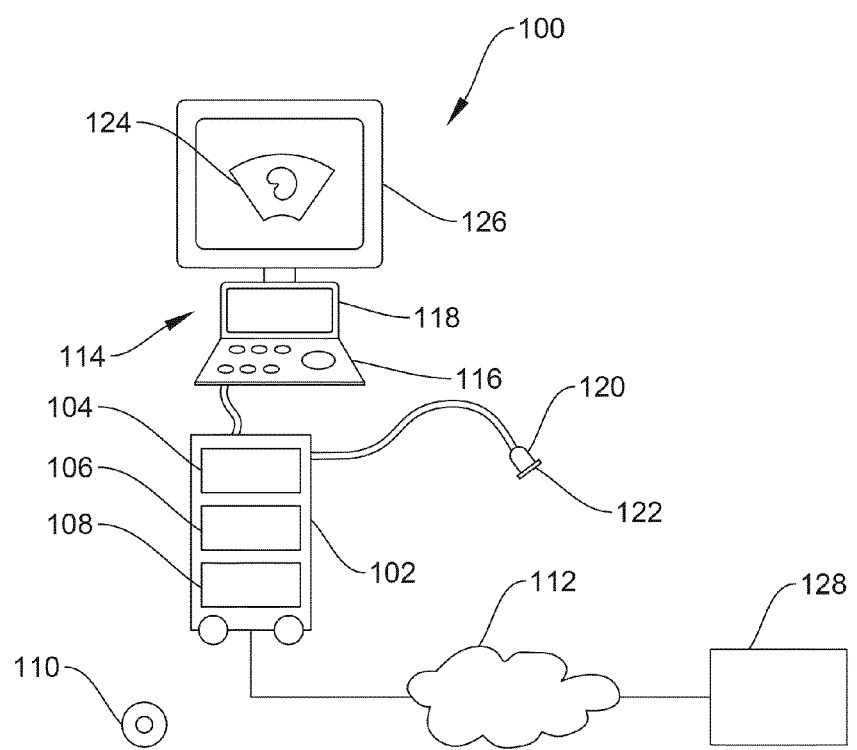

Useful embodiments of the invention shall now be described with reference to the attached figures. Similar elements or features are designated with the same reference signs. The figures depict:

FIG. 1 a medical image of a fetal ultrasound scan of a subject with gestational age 8 weeks and 4 days, with annotated bounding boxes;

FIG. 2 a flow diagram of an embodiment of the detection method according to the invention;

FIG. 3 a flow diagram of another embodiment of the detection method of the invention;

FIG. 4 a flow diagram of an inferencing scheme according to an embodiment of the invention;

FIG. 5 an example of localization of the anatomical structures achievable with an embodiment of the invention, wherein (a) shows the boxes around uterus, gestational sac (GS) and embryo, (b) shows the bounding box for yolk sac (YS) in a cropped GS image;

FIG. 6 a schematic diagram of the first and/or second neural network (NN);

FIG. 7 a flow diagram of the training method according to an embodiment of the invention;

FIG. 8 a schematic representation of the system according to an embodiment of the invention.

DESCRIPTION OF EMBODIMENTS

FIG. 1 illustrates a possible training image for training the object detector function, namely a 2D B-mode medical ultrasound image 1 acquired during a first trimester scan at gestational age 8 w 4 d. Bounding boxes have been drawn in by a human subject and annotated to generate the output training data. The largest bounding box has been drawn in around the uterus (U), another around the gestational sac (GS), and both embryo (E) and yolk sac (YS) are visible inside the gestational sac which increases the probability of a normal pregnancy, as opposed to situations where no embryo is visible inside the GS.

FIG. 2 illustrates an embodiment of a method for detecting anatomical structures in medical images 1, such as a series of 2D ultrasound images 1a, 1b, 1c. Each of these images covers a slightly different field-of-view 2, and organs or anatomical structures 3 are distinguishable on the images 1. These images are passed, one by one, though the object detector function 44 described in more detail below. The object detector function 4 preferably comprises at least two neural networks 40, 44, as described herein. The output of the object detector function 4 is at least one bounding box 5, or rather the coordinates thereof, as well as a confidence score of it containing a particular anatomical structure. The confidence score may be the objectness, i.e. the probability of the box 5 containing an object/anatomical structure, and/or the probability of the object being of one particular class.

In a useful embodiment, the input images 1 are displayed in step 8 with the bounding boxes 5 having a sufficiently high confidence score drawn in, for example on a display device such as a screen, which may be connected to the image acquisition unit. The probability of a pre-defined medical condition of the subject, for example a normal/abnormal condition (e.g. IUP or non-IUP pregnancy) can then be determined in step 6 based on the detected anatomical structures 3, their spatial location and/or relation with respect to each other. Accordingly, the inferencing scheme 6 uses the bounding boxes 5 computed by the object detector function 4, and may include an algorithm capable of computing e.g. whether a particular class of bounding box 5 is completely comprised within another class, as well as the presence or absence of certain classes of anatomical structures 3. Also, the relative spatial positions of bounding boxes 5 may be calculated and used in deducting a suitable probability 7 for a medical condition.

FIG. 3 illustrates the object detector function 4 in more detail: The input is again one or several medical images 1 of fields-of-view 2, at least some of which depict organs or anatomical structures 3. In an embodiment, the received medical images may have any dimension and pixel size, whereas the first NN 40 works best on a square image of size M*$2^Z$×M*$2^Z$, where M is an uneven number. Therefore, a medical image 1 is optionally up-sampled or down-sampled in step 39 in order to fit the expected input dimensions of the first neural network 40. The output of the first NN 40 is at least the coordinates (usually also confidence scores) of bounding boxes 50, 51, 52. If one of the detected bounding boxes has a class belonging to a pre-determined larger-sized anatomical structure 3a, the detected bounding box 50 will be used in a cropping step 42, in order to crop the medical image 1 to the first bounding box 50, thereby generating a cropped image 11. "Cropping" means e.g. the operation performed by a snipping tool in photo processing, i.e. cutting out a smaller image 11 from the larger image 1, the cutting edges being along the edges of the bounding box 50. Accordingly, cropped image 11 need not necessarily be a square image. Therefore, this image is preferably subjected to a step 45 of down-sampling or up-sampling, so that the cropped image 11 preferably has a pre-defined dimension (for example a square 2D image, as for the first NN), which is then fed to the second NN 44. The output of this second neural network is then at least one second bounding box 54 containing a smaller-sized anatomical structure 3b. The smaller-sized anatomical structure 3b is typically so small in relation to the field-of-view 2 or the overall organ or structure imaged, or has such fine detailed structure, that it is difficult to train the first NN 40 to detect it. However, if the knowledge of where such structure is expected is used to first crop the image 1 around a bounding box 50, then the training of a second NN 44 to detect (possibly exclusively) this second class of smaller-sized anatomical structures 3b, presents no difficulty.

FIG. 4 is a schematic representation of an embodiment of the inferencing scheme 6, which uses the bounding boxes computed from the first and second NNs. The inference step 60 may compute—in the example of a first trimester ultrasound scan—whether a bounding box for GS is present. If yes, the method goes on to step 61. If no, the chances of it being an abnormal pregnancy (medical condition 7c) is increased. In step 61, the algorithm determines whether the bounding box of GS is a subset of the bounding box of the uterus. If yes, the probability of it being a normal IUP (condition 7a) is increased, and the method proceeds to step 62. If not, i.e. a GS is present but not within the uterus, the probability of the medical condition 7b "ectopic pregnancy" is increased. These steps may be performed already after the image has passed the first NN 40, before the cropping step 42 and second NN 44 have been applied. Then, in the second stage of inferencing, YS and embryo are detected and localized. Step 62 determines whether the bounding box for yolk sac and/or embryo are subsets of the bounding box for GS. If yes, then the probability of it being a normal pregnancy (7a) is increased. If YS and embryo are not detected within GS, then the chances of abnormal pregnancies are increased (7c).

Figure 5B:
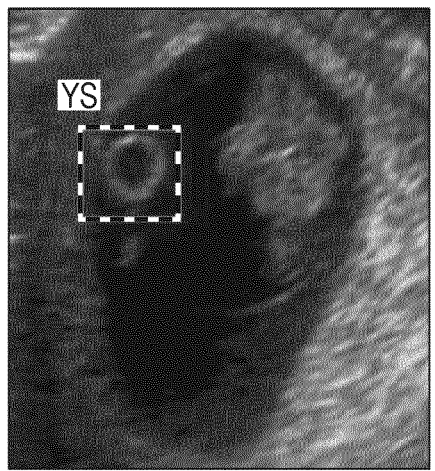

FIG. 5 illustrates a possible result of the hierarchical object detector function: In FIG. 5a bounding boxes are depicted which have been identified around the uterus, GS and embryo. In accordance with an embodiment of the invention, the image has been cropped around the GS bounding box, as shown in FIG. 5b. A second NN has been trained to detect YS within GS, and the resulting bounding box is drawn in the figure.

FIG. 6 shows a schematic representation of the first and/or second NN, which is preferably an adaptation of the YOLOv3 tiny network. In the representation, each image input or feature map 20, 22 is annotated on the top with its dimension (square image), and on the bottom with the number of channels. Thus, the input data set 20 is a square 2D image of size 416×416 pixels, and having three channels, for example being a color image such as RGB. In grey scale images, typically each channel has the same value. The layer just before the output layer 32a, on the other hand, has a dimension of only 13×13 and a depth of 512 channels.

The input layer 20 is submitted to a convolutional filter 24 of dimension 3×3 and stride 1, followed by a maxpool filter 28 of size 2×2 and stride 2. To be more precise, 16 of such convolutional filters 24 are used in this layer, each of depth 3, resulting in a feature map 22a having a depth of 16, and having a dimension 208, which is reduced by a factor of 2 with respect to the input layer 20. Feature map 22a is convolved with another convolutional filter of dimension 3×3 and stride 1, followed by a maxpool 28 of size 2×2 and stride 2, resulting in feature map 22b. This operation, or block of layers, namely convolutional filters 24 of dimension 3×3 and stride 1, followed by maxpool 28 of size 2×2 and stride 2, is repeated another two times, resulting in a total of 5 convolutional layers 24, each followed by a pooling layer 28, reducing the dimensions by a factor of 2 each time. Then, feature map 22e is again submitted to convolutional filter 24, but this time followed by a maxpool 29 of size 2×2 and stride 1, which thus does not lead to further dimensional reduction in the next feature map 22f, which has a depth of 512 and dimension 13×13. This layer is followed by another convolutional filter 24 of dimension 3×3 and stride 1, resulting in output volume 22g. This is submitted to a convolutional filter 25 of dimension 1×1 and stride 1, which is used for depth reduction from 1024 to 256. Thus, convolutional filter 25 is what might be called a feature map pooling or projection layer. This filter decreases the number of feature maps (the number of channels) yet retains the salient features. The output 22h of this projection layer is submitted to another convolutional filter 24 of dimension 3×3 and stride 1, resulting in output volume 22i, which is finally followed by the convolutional filter 26 of dimension k and stride 1, wherein k=(C+5)×B, wherein C is the number of classes and B is the number of anchor boxes, which is 3 in a preferred example. This results in the output layer 32a, which may be termed the YOLO inference at scale 1, and which may have the output format as explained above, i.e., for each of the 13×13 grid points, it contains the data of up to B (preferably 3) bounding boxes, each bounding box including the four box coordinates, and objectness score and the individual class probabilities. The bounding boxes are filtered out using a threshold on the objectness and/or class scores.

In order to implement the detection at scale 2, an earlier feature map 22d is subjected to convolutional filter 24, resulting in feature map 22j. Further, feature map 22h is submitted to a convolutional filter 25, followed by up-sampling 30 of size 2 and stride 1, resulting in feature map 22l. This is concatenated with feature map 22j to result in feature map 22m. This is submitted to another 3×3 convolutional filter 24, resulting in feature map 22n. This feature map is again submitted to the convolutional filter 26, resulting in the output volume (3D tensor) 32b, which accordingly contains the coordinates and probabilities for B bounding boxes at each cell of the higher-resolution 26×26 grid. The bounding box predictions at scale 1 and scale 2 may be combined as described above.

FIG. 7 schematically depicts a training method. Therein, training images 12 have been provided. For the example described herein, fetal ultrasound scans with gestational age less than 11 weeks have been collected for the development of the algorithm. Each of the image frames gathered from ultrasound scans has then been used for the manual annotations. Each image is annotated with axis aligned bounding boxes covering the entire anatomical structure (U, GS, E, YS, an example of which is shown in FIG. 1). Data distribution is insured to be uniform, with equal weightages given to all possible gestational ages. For example, more than 500 to 5.000 images 12 have been annotated by drawing the bounding boxes for GS, U and embryo, wherein the respective annotation is denoted 70, 71 and 72 in FIG. 7. The gestational sac annotation 70 is used to crop the gestational sac (step 73). On the cropped images, the yolk sac is annotated and the annotation saved as 75.

Thus, the training images 12 are used as input training data, and the GS annotation 70, uterus annotation 71 and embryo annotation 72 as output training data to train the first NN in step 76. The image cropped around GS 73 and the yolk sac annotation 75 are used accordingly to train the second NN in step 78.

FIG. 8 is a schematic representation of an ultrasound system 100 according to an embodiment of the invention and configured to perform the inventive method. The ultrasound system 100 includes a usual ultrasound hardware unit 102, comprising a CPU 104, GPU 106 and digital storage medium 108, for example a hard disc or solid-2019PF00350 state disc. A computer program may be loaded into the hardware unit, from CD-ROM 110 or over the internet 112. The hardware unit 102 is connected to a user-interface 114, which comprises a keyboard 116 and optionally a touchpad 118. The touchpad 118 may also act as a display device for displaying imaging parameters. The hardware unit 102 is 5 connected to an ultrasound probe 120, which includes an array of ultrasound transducers 122, which allows the acquisition of B-mode ultrasound images from a subject or patient (not shown), preferably in real-time. B-mode images 124 acquired with the ultrasound probe 120, as well as bounding boxes 5 generated by the inventive method performed by the CPU 104 and/or GPU, are displayed on screen 126, which may be any commercially available display unit, e.g. a screen, television set, flat screen, projector etc. Further, there may be a connection to a remote computer or server 128, for example via the internet 112. The method according to the invention may be performed by CPU 104 or GPU 106 of the hardware unit 102 but may also be performed by a 15 processor of the remote server 128.

The above-discussion is intended to be merely illustrative of the present system and should not be construed as limiting the appended claims to any particular embodiment or group of embodiments. Thus, while the present system has been described in particular detail with reference to exemplary embodiments, it should also 20 be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

REFERENCE SIGNS

Medical images
Field-of-view
Anatomical structure
3*a* Larger-sized anatomical structure
3*b* Smaller-sized anatomical structure
Object detector function
Bounding boxes
Inferencing scheme
Medical condition and probability thereof
7*a* Medical condition and probability thereof
7*b* Medical condition and probability thereof
7*c* Medical condition and probability thereof
8 Display
11 Cropped image
12 Training images
20 Input layer
22 Feature maps
24 Convolutional filter of dimension 3×3 and stride 1
25 Convolutional filter of dimension 1×1 and stride 1
26 Convolutional filter of dimension K=(C+5)×B and stride 1
28 Maxpool of size 2×2 and stride 2
29 Maxpool of size 2×2 and stride 1
30 Up-sample of size 2×2 and stride 1
32*a* Output layers
39 up-sampling or down-camping
40 First neural network
42 Cropping step
44 Second neural network
45 up-sampling or down-camping
50 First bounding box (coordinates of)
51 Bounding boxes (coordinates of)
52 Bounding boxes (coordinates of)
54 Second bounding box (coordinates of)
60 IF/ELSE inference steps
61 IF/ELSE inference steps
62 IF/ELSE inference steps
70 GS annotation
71 U annotation
72 Embryo annotation
73 Crop gestational sac
75 YS annotation
76 Training step NN1
78 Training step NN2
100 Ultrasound system
102 Hardware unit
104 CPU
106 GPU
108 Digital storage medium
110 CD-ROM
112 Internet
114 User interface
116 Keyboard
118 Touchpad
120 Ultrasound probe
122 Ultrasound transducers
124 B-Mode image
126 Screen
128 Remote server

The invention claimed is:

1. A computer-implemented method for automatically detecting anatomical structures in a medical image of a subject, the method comprising the steps of:
   receiving at least one medical image of a field-of-view of the subject;
   applying an object detector function to the medical image, wherein the object detector function is trained to detect a plurality of classes of anatomical structures, thereby generating as output the coordinates of a plurality of bounding boxes and a confidence score for each bounding box, the confidence score giving the probability of the bounding box containing an anatomical structure belonging to one of the plurality of classes;

wherein the object detector function performs the steps of:
applying a first neural network to the medical image, wherein the first neural network is trained to detect a first plurality of classes of larger-sized anatomical structures, thereby generating as output the coordinates of at least one first bounding box and the confidence score of it containing a larger-sized anatomical structure;
cropping the medical image to the first bounding box, thereby generating a cropped image containing the image content within the first bounding box;
applying a second neural network to the cropped medical image, wherein the second neural network is trained to detect at least one second class of smaller-sized anatomical structures, thereby generating as output the coordinates of at least one second bounding box and the confidence score of it containing a smaller-sized anatomical structure,
the object detector function is based on a hierarchical relationship between larger-sized and smaller-sized anatomical structures, wherein at least one of the first plurality of classes of larger-sized anatomical structures is expected to contain one or several of the classes of smaller-sized anatomical structures.

2. The method of claim 1, comprising a further step of determining the probability of a pre-defined medical condition of the subject, wherein the probability of a pre-defined medical condition is determined using an inferencing scheme based on the presence or absence of one or several classes of anatomical structures and/or on the relative spatial locations of the detected bounding boxes containing anatomical structures.

3. The method of claim 2, wherein the probability of the medical condition "normal pregnancy" is increased, if the detected bounding box of a uterus comprises a detected bounding box of a gestational sac, and the detected bounding box of a gestational sac comprises a detected bounding box of an embryo and/or a yolk sac.

4. The method of claim 1, wherein the probability of a pre-defined medical condition is increased, if a first detected bounding box containing a first class of anatomical structure encompasses a second detected bounding box containing a second class of anatomical structure.

5. The method of claim 1, wherein the method is iterated for a plurality of two-dimensional medical images with different fields-of-view, acquired during the same examination session of the subject, and the confidence scores for the detected bounding boxes are used to compute the medical image(s) or field(s)-of-view which are most suitable for further evaluation.

6. The method of claim 1, wherein the first neural network and/or the second neural network is a fully convolutional neural network.

7. The method of claim 1, wherein the first neural network and/or the second neural network comprises the detection of anatomical structures at two different scales, each scale given by a pre-determined down-sampling of the medical image.

8. The method of claim 1, wherein the first neural network and/or the second neural network is a YOLO fully convolutional neural network.

9. The method of claim 1, wherein the object detector function is trained to detect 2 to 12, preferably 3 to 5 classes of anatomical structures.

10. The method of claim 1, wherein the medical image has been acquired during an antenatal first trimester ultrasound scan, and the plurality of classes of anatomical structures comprises uterus, gestational sac, embryo and/or yolk sac.

11. A method for training an object detector function for detecting a plurality of classes of anatomical structures in medical images, the object detector function comprising a first neural network, the method comprising:
Receiving input training data, namely at least one medical image of a field-of-view of a subject;
Receiving output training data, namely a tensor comprising coordinates of at least one first bounding box within the medical image containing a larger-sized anatomical structure belonging to one of a first plurality of classes of larger sized anatomical structures, and a number indicating the class of the larger-sized anatomical structure;
Training the first neural network by using the input training data and the output training data;
Receiving input training data, namely a cropped image containing the image content of a first bounding box containing a larger-sized anatomical structure;
Receiving output training data, namely a tensor comprising coordinates of at least one second bounding box within the cropped image containing a smaller-sized anatomical structure belonging to at least one second class of smaller sized anatomical structures, wherein the smaller-sized anatomical structure is classified as a smaller-sized anatomical structure to reflect the potential relationship of a smaller anatomical structure being able to be contained by the larger-sized anatomical structure;
Training a second neural network by using the input training data and the output training data.

12. The training method of claim 11, wherein the output training data comprises a tensor having a size of N×N×[B*(4+1+C)], where N×N is the dimension a final feature map, B is the number of anchor boxes, and C is the number of classes, wherein the number of anchor boxes is preferably 3 or 6.

13. The training method of claim 11, wherein the output training data is generated by applying a 1×1 detection kernel on a down-sampled feature map, wherein the shape of the detection kernel is 1×1×(B*(5+C)), where B is the number of anchor boxes, and C is the number of classes, wherein the number of anchor boxes is preferably 3 or 6.

14. A non-transitory, computer-readable medium comprising instructions that when executed on a processor, cause the processor to
receive at least one medical image of a field-of-view of the subject;
apply an object detector function to the medical image, wherein the object detector function is trained to detect a plurality of classes of anatomical structures, thereby generating as output the coordinates of a plurality of bounding boxes and a confidence score for each bounding box, the confidence score giving the probability of the bounding box containing an anatomical structure belonging to one of the plurality of classes;
wherein the object detector function performs the steps of:
apply a first neural network to the medical image, wherein the first neural network is trained to detect a first plurality of classes of larger-sized anatomical structures, thereby generating as output the coordinates of at least one first bounding box and the confidence score of it containing a larger-sized anatomical structure;
crop the medical image to the first bounding box, thereby generating a cropped image containing the image content within the first bounding box;

apply a second neural network to the cropped medical image, wherein the second neural network is trained to detect at least one second class of smaller-sized anatomical structures, thereby generating as output the coordinates of at least one second bounding box and the confidence score of it containing a smaller-sized anatomical structure, the object detector function is based on a hierarchical relationship between larger-sized and smaller-sized anatomical structures, wherein at least one of the first plurality of classes of larger-sized anatomical structures is expected to contain one or several of the classes of smaller-sized anatomical structures.

15. A system for automatically detecting anatomical structures in a medical image of a subject, the system comprising:

a first interface, configured for receiving at least one medical image of a field-of-view of the subject;

a computational unit configured for applying an object detector function to the medical image, wherein the object detector function is trained to detect a plurality of classes of anatomical structures, thereby generating as output the coordinates of a plurality of bounding boxes and a confidence score for each bounding box, the confidence score giving the probability of the bounding box containing an anatomical structure belonging to one of the plurality of classes, wherein the computational unit is configured for performing the steps of:

applying a first neural network to the medical image, wherein the first neural network is trained to detect a first plurality of classes of larger-sized anatomical structures, thereby generating as output the coordinates of at least one first bounding box and the confidence score of it containing a larger-sized anatomical structure;

cropping the medical image to the first bounding box, thereby generating a cropped image containing the image content within the first bounding box;

applying a second neural network to the cropped medical image, wherein the second neural network is trained to detect at least one second class of smaller-sized anatomical structures, thereby generating as output the coordinates of at least one second bounding box and the confidence score of it containing a smaller-sized anatomical structure, wherein the object detector function is based on a hierarchical relationship between larger-sized and smaller-sized anatomical structures, wherein at least one of the first plurality of classes of larger-sized anatomical structures is expected to contain one or several of the classes of smaller-sized anatomical structures.

* * * * *